US010360361B2

(12) United States Patent
Morgner et al.

(10) Patent No.: US 10,360,361 B2
(45) Date of Patent: Jul. 23, 2019

(54) COMPUTER-IMPLEMENTED METHOD FOR CONTROLLING ACCESS

(71) Applicant: BUNDESDRUCKEREI GMBH, Berlin (DE)

(72) Inventors: Frank Morgner, Grünheide (DE); Paul Bastian, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 100 days.

(21) Appl. No.: 15/549,949

(22) PCT Filed: Feb. 10, 2016

(86) PCT No.: PCT/EP2016/052806
§ 371 (c)(1),
(2) Date: Aug. 9, 2017

(87) PCT Pub. No.: WO2016/128454
PCT Pub. Date: Aug. 18, 2016

(65) Prior Publication Data
US 2018/0025145 A1    Jan. 25, 2018

(30) Foreign Application Priority Data

Feb. 10, 2015 (DE) .................. 10 2015 202 308
Feb. 20, 2015 (EP) ..................... 15156033

(51) Int. Cl.
*G06F 21/33* (2013.01)
*G06F 21/35* (2013.01)
(Continued)

(52) U.S. Cl.
CPC .............. *G06F 21/33* (2013.01); *G06F 21/35* (2013.01); *G06F 21/6227* (2013.01);
(Continued)

(58) Field of Classification Search
CPC ....... G06F 21/33; G06F 21/35; G06F 21/6227
(Continued)

(56) References Cited

U.S. PATENT DOCUMENTS

2009/0328186 A1*  12/2009  Pollutro ................. G06F 21/31
                                                        726/13
2013/0290719 A1*  10/2013  Kaler ..................... G06F 21/41
                                                        713/168

OTHER PUBLICATIONS

International Search Report and Written Opinion issued in corresponding International Application No. PCT/EP2016/052806 dated May 11, 2016, 12 pages.
(Continued)

*Primary Examiner* — Anthony D Brown
(74) *Attorney, Agent, or Firm* — J. Clinton Wimbish; Nexsen Pruet, PLLC

(57) ABSTRACT

The invention relates to a computer-implemented method for controlling access of a terminal (118) to an attribute (112) stored in an ID token (100), wherein the ID token (100) is associated with a user, wherein the method comprises receipt of an identification of the terminal (118) by the ID token (100) and checking by the ID token (100) if a session identification validly associated with the identification of the terminal (118) is stored in the ID token (100), wherein, if a session identification validly associated with the identification of the terminal (118) is stored in the ID token (100), the ID token (100) transmits the session identification to the terminal (118) and grants the terminal (118) access to the attribute (112), wherein a subsequent communication with access to the attribute (112) is carried out in an encrypted manner using a session-specific session key, wherein the session-specific session key is stored in the ID token (100) in a manner associated with the session identification or the identification of the terminal (118).

16 Claims, 4 Drawing Sheets

(51) Int. Cl.
*G06F 21/62* (2013.01)
*H04L 29/06* (2006.01)
*G06F 21/00* (2013.01)

(52) U.S. Cl.
CPC ........ *H04L 63/045* (2013.01); *H04L 63/0823* (2013.01); *H04L 63/10* (2013.01)

(58) Field of Classification Search
USPC .......................................................... 726/4
See application file for complete search history.

(56) References Cited

OTHER PUBLICATIONS

BSI, Advanced Security Mechanisms for Machine Readable Travel Documents and eIDAS Token—Part 2, Dec. 16, 2014, XP055257174, Retrieved from internet: URL: https://www.bsi.bund.de/EN/Publications/TechnicalGuidelines/TR03110/BSITR03110.html, retrieved on Mar. 10, 2016.

BSI et al., Advanced Security Mechanisms for Machine Readable Travel Documents and eIDAS Token—Part 3, Common Specifications Version 2.20, Feb. 3, 2015, XP055258090, Retrieved from internet: URL: https://www.bsi.bund.de/SharedDocs/Downloads/EN/BSI/Publications/TechGuidelines/TR03110/BSI_TR-03110_Part-3-V2_2.pdf?_blob=publicationFile&v=1, retrieved on Mar. 14, 2016.

* cited by examiner

COMPUTER-IMPLEMENTED METHOD FOR CONTROLLING ACCESS

CROSS REFERENCE TO PRIORITY APPLICATIONS

This application is a U.S. National Phase of PCT/EP2016/052806, filed Feb. 10, 2016, which claims the benefit of German Application No. 10 2015 202 308.7, filed Feb. 10, 2015 and European Application No. 15156033.1, filed Feb. 20, 2015, each of which are incorporated by reference in their entireties.

FIELD OF INVENTION

The invention relates to a computer-implemented method for controlling access, an ID token, a method for granting access to an access-restricted security facility, a terminal, and a security system.

DESCRIPTION OF THE RELATED ART

Security facilities, such as alarm systems or lock systems, have become widespread both in the private and commercial sectors. Security facilities are used for example to grant only a predefined group of people access to a building or part of a building. In order for a specific person to be granted access to the security facility, it is necessary for said person to be authenticated to the security facility. The person can be authenticated by way of example by inputting a password via a terminal or by means of an authorisation card which exchanges information with the terminal. Document DE 10 20013 105 727 discloses a method for deactivating a security facility with use of an electronically readable identification document. The technical Guideline TR-03110 also describes various security mechanisms for machine-readable documents.

DETAILED DESCRIPTION OF THE INVENTION

The object of the invention is to create an improved computer-implemented method for controlling access to an attribute stored in an ID token, an improved ID token, an improved method for granting access to an access-restricted security facility, an improved terminal, and an improved security system.

The objects underlying the invention are achieved by the features of the independent claims. Preferred embodiments of the invention are specified in the dependent claims.

Embodiments of the invention relate to a computer-implemented method for controlling access of a terminal to an attribute stored in an ID token, wherein the ID token is associated with a user, wherein the method comprises receipt of an identification of the terminal by the ID token and checking by the ID token if a session identification validly associated with the identification of the terminal is stored in the ID token, wherein, if a session identification validly associated with the identification of the terminal is stored in the ID token, the ID token transmits the session identification to the terminal and grants the terminal access to the attribute, wherein a subsequent communication with access to the attribute is carried out in an encrypted manner using a session-specific session key, wherein the session-specific session key is stored in the ID token in a manner associated with the session identification or the identification of the terminal, wherein, if no session identification validly associated with the identification of the terminal is stored in the ID token, the method comprises the following steps:

authenticating the terminal by the ID token and authenticating the ID token to the terminal, wherein, following successful authentications, the terminal is granted access to the attribute, deriving a session-specific session key, wherein a subsequent communication with access to the attribute is carried out in an encrypted manner using a session-specific session key, deriving a session identification, storing, in the ID token, the identification of the terminal associated with the session identification, storing, in the ID token, the session-specific session key associated with the identification of the terminal.

The session-specific session key can be directly stored in the ID token in a manner associated with the identification of the terminal, or can be stored in the ID token indirectly via the session identification associated with the identification of the terminal.

The term "ID token" denotes a device, such as a portable electronic device, for example what is known as a USB stick, or a document, in particular a document of value or a security document.

A "document" is understood to mean a paper-based and/or plastic-based document, for example identification documents, in particular passports, personal identity cards, visas and driver licenses, vehicle registration documents, vehicle titles, company identification documents, health insurance cards or other ID documents and also chip cards, payment means, in particular bank cards and credit cards, consignment notes or other proofs of authority, in which there is integrated a data memory for storing at least one attribute.

Hereinafter, an "attribute" is understood to mean a data value, for example a number or a text. The attribute can be a detail relating to the identity of a user associated with the ID token, in particular relating to what is known as the digital identity thereof. By way of example, a surname, first name, or address of the user can constitute attributes. An attribute can also include data which serve to check the authorisation of the user to use a specific online service, for example the age of the user if the user wishes to use an online service which is reserved for a specific age group, or another attribute which records whether the user is a member of a specific group authorised to use the online service. An "attribute" can also denote a data value which comprises authorisation to access an access-restricted security facility. In this context, the attribute can also specify the membership of a specific group, wherein access to the access-restricted security facility is dependent on said group membership.

An access-restricted security facility is understood within the scope of the present description to mean an arrangement that controls the access to specific spatial areas or also access to specific data. Access is possible only once a corresponding authorisation has been verified by means of the ID token.

An authentication server is a server which manages the authorisations necessary for this purpose and reconciles these with an internal database as necessary.

A "static" key is understood hereinafter to mean a cryptographic key or data value which is stored in a non-volatile storage medium and can be used for more than just one session. By contrast, session keys or session-specific, temporary keys or data values are generated originally only for one session and are not permanently stored, such that they actually can no longer be used in a further session.

The invention, however, now proposes to use precisely these session-specific session keys a number of times, i.e. in different sessions, provided the above-described preconditions regarding the valid storage in the ID token of the session identification associated with the identification of the terminal are met.

Embodiments of the invention could have the advantage that access of the terminal to the attribute can be controlled in a particularly secure manner by the ID token.

The risk of unauthorised access to the attribute is thus minimised. In spite of the high security, the speed with which the access control is carried out by the ID token could be high, since complex checks, for example signature checks, do not have to be performed for each attempt by the terminal to access the attribute. Provided a session identification validly associated with the identification of the terminal is stored in the ID token, signature checks and for example associated elliptic curve operations, which cost time and energy, are avoided. There is also no need to calculate a new session-specific session key. Instead, there could be quick memory access to a corresponding memory region of the ID token so as to enable access of the terminal following verification of the validity of the storage of the session identification associated with the identification of the terminal, preferably with no further security checks or authentications.

A further advantage of the invention could be that the ID token does not have to disclose its identity to the terminal initially at the time of communication with the terminal. A situation in which arbitrary terminals attempt to establish contact with the ID token in order to learn the identity thereof could thus be avoided. The latter could lead to a possible "tracking" of the ID token. Instead, the invention proposes that the ID token and the terminal must perform a mutual authentication procedure in the case that the terminal is unknown to the ID token, that is to say if the identification of the terminal in particular is not stored anywhere in the ID token. Mutual trust is provided only if this authentication procedure has been successfully completed.

In accordance with one embodiment of the invention, a salt is generated by the ID token in the case that a session identification validly associated with the identification of the terminal is stored in the ID token. Furthermore, a hash value is generated by the ID token from the identification of the terminal, the salt, and the session identification. The session identification is then transmitted from the ID token to the terminal in the form of a transmission of the hash value together with the salt.

This could have the advantage that the communication security between ID token and terminal is further increased. Even a man-in-the-middle attack on the communication between ID token and terminal would merely deliver a hash value, which is worthless without knowledge of the session identification.

The session identification in principle should be a secret which is known only to the ID token and the terminal. The term of "deriving" the session identification is to be understood here such that whatever the session identification is will be defined in the session of the authentication process within the scope of the authentication process or subsequently thereto. The terminal can do this and can then transmit the session identification to the ID token, or the ID token can do this and can then transmit the session identification to the terminal, or the ID token and terminal can do this independently of one another. The latter scenario requires the assurance that the ID token and terminal arrive independently of one another at the same result, that is to say the same session identification. The same is true with regard to the deriving of the session-specific session key.

In accordance with one embodiment of the invention, if a session identification validly associated with the identification of the terminal is stored in the ID token, the access of the terminal to the attributes is granted for the current session between ID token and terminal without a further authentication process between the ID token and terminal.

In accordance with one embodiment of the invention,
if there is no session identification validly associated with the identification of the terminal stored in the ID token, metadata of a permanent certificate of the terminal are received by the ID token at the time of authentication of the terminal, wherein the metadata comprise an access authorisation, wherein, following successful completion of the authentications, at least the access authorisation is stored in the ID token in a manner associated with the identification of the terminal, and access of the terminal to the attribute is granted in accordance with the access authorisation,
if there is a session identification validly associated with the identification of the terminal stored in the ID token, the access authorisation associated with the identification of the terminal is read by the ID token, wherein access of the terminal to the attribute is granted in accordance with the access authorisation.

This could have the advantage that, by means of the certificate of the terminal, it is possible to define already in advance how, and to which attributes the terminal should receive access. By way of example, specific attributes can be specified so that, on the whole, full access to all attributes stored in the ID token is not granted, and instead access to only a limited selection hereof is granted. Furthermore, the access authorisation can contain a detail as to whether only read access is granted, or whether read and write access is granted.

In a specific application it could be conceivable that said terminal is used in a security system in which the terminal is coupled to an access-restricted security facility. With first-time use of the ID token to access the security facility, the terminal could store a corresponding access authorisation as attribute in the ID token. For this first-time memory access, the terminal requires a corresponding access authorisation. It is also conceivable that the terminal in subsequent communication processes with the ID token will also have to reserve the authorisation to prevent or limit the possibility of access to the security facility, for example by withdrawal of the access authorisation.

In accordance with one embodiment of the invention,
if there is no session identification validly associated with the identification of the terminal stored in the ID token, a first timestamp is stored in the ID token in a manner associated with the identification of the terminal, following successful completion of the authentications, wherein the first timestamp specifies a maximum period of validity of the session-specific session key,
if there is a session identification validly associated with the identification of the terminal stored in the ID token, the timestamp associated with the identification of the terminal is read, wherein the session-specific session key is deemed to be validly stored only if the first timestamp is still valid.

For example, the metadata in accordance with one embodiment of the invention comprise the first timestamp.

In accordance with a further embodiment of the invention, it is possible that the first timestamp is generated for the storing of the session-specific session key in the ID token, wherein the first timestamp is generated on the basis of a predefined relative period of validity. Said relative period of validity, which is predefined, could comprise for example a period of time such as a year, six months, or 24 hours, wherein for example a system time of the terminal or of the ID token is noted with the storage of the session-specific session key, and the relative period of validity is added to the system time. This gives the maximum period of validity in the form of an absolute time value, for example an expiry date. In the event that the metadata constitute a timestamp, the period of validity for access of the terminal to the attribute, starting from an initial time, can thus be provided for a specific first time period without further authentication. The authentication in this case therefore is not carried out constantly, but only at predefined times.

The first timestamp could also specify how often the session identification can be used for different sessions within a predefined period of time before a new session identification has to be used, i.e. the authentications have to be carried out again in part or completely. For example, it can be defined that the session identification within the space of a month can be used only in 5 different sessions. After the 5$^{th}$ session, the session identification is invalid. It can also be defined that the session identification can be used only in 5 different sessions in relation to a period of time of any length. The session identification in this case too is thus invalid after the 5$^{th}$ session.

A specific practical example could be the above-described security system, in which an authentication server performs the final check of the attribute and grants access to the security facility. Here, the terminal operates merely as an interface between ID token and authentication server and ensures that the ID token can be sure that it is communicating with a trustworthy authority (terminal). As soon as the authentication server has granted access to the security facility for the first time, a corresponding attribute could be stored in the ID token via the terminal, which attribute enables further access to the security facility for a specific first period of time, without advanced and additional complex authentication.

In principle, it is also possible that the metadata, as described above, comprise the first timestamp, wherein in this case the terminal itself defines the time intervals at which the terminal must be authenticated by the ID token.

In accordance with one embodiment of the invention, the authentication by the ID token comprises the receipt of a permanent certificate of the terminal, the deriving of a terminal hash value from the certificate, and a checking as to whether the terminal hash value is validly stored in the ID token, wherein, if the terminal hash value is validly stored in the ID token, access of the terminal to the attribute is granted without further checking of the permanent certificate of the terminal, wherein the authentication by the ID token comprises the following steps:
  deriving a first signature from the permanent certificate of the terminal and verifying the first signature with the terminal hash value and a public key of the terminal associated with the permanent certificate, wherein the terminal hash value comprises a hash of the metadata of the certificate,
  receiving a session-specific public key of the terminal, generating and sending a random first secret to the terminal,
  receiving a second signature from the terminal and verifying the second signature with use of the session-specific public key of the terminal, the random first secret, and the public key of the terminal associated with the permanent certificate,
  following successful verification of the first and second signature, storing the terminal hash value in the ID token.

This could have the advantage that the access of the terminal to the attribute can be controlled in a multi-step manner by the ID token. The risk of unauthorised access to the attribute is thus minimised, yet the speed with which the access control is carried out by the ID token can still be high, since the above-described signature checks do not have to be carried out completely for each attempt made by the terminal to access the attribute. Instead, a quick memory access to a corresponding memory region of the ID token is carried out in order to enable access of the terminal to the attribute once the validity of the hash value in the ID token has been checked, without further checking of the permanent certificate of the terminal.

The multi-step nature of the access control is thus as follows: in a first step, the ID token checks whether a session identification validly associated with the identification of the terminal is stored in the ID token. Terminal and ID token authentication could be completely spared. If the check performed during the first step is unsuccessful, a check is performed in a second step as to whether or not at least the terminal hash value is validly stored in the ID token. Here, the ID token authentication could be spared. Only if the second step of the checking process is also unsuccessful would a complete terminal and ID token authentication have to be performed in a third step.

In accordance with one embodiment, a permanent public key of the terminal is associated with the permanent certificate, wherein, if the terminal hash value is not validly stored in the ID token, following the successful verification of the first and second signature, the permanent public key is stored by the ID token in the ID token in a manner linked to the terminal hash value and further communication with the terminal is carried out within the scope of the authentication in an encrypted manner using the permanent public key of the terminal. If, by contrast, the terminal hash value is validly stored in the ID token, the permanent public key of the terminal stored in a manner linked to the terminal hash value is read and further communication with the terminal is carried out within the scope of the authentication in an encrypted manner using the permanent public key of the terminal. For example, the permanent public key is contained in the permanent certificate, wherein the terminal hash value comprises a hash of the permanent public key.

This could have the advantage that the speed of the authentication of the terminal by the ID token is further increased, since if the terminal hash value is validly stored in the ID token there is no need for a renewed exchange in the form of a data transfer of the permanent public key of the terminal. The permanent public key of the terminal can be read directly from the memory of the ID token and can be used for the further communication with the terminal. Since the permanent public key of the terminal is contained in the permanent certificate, it is automatically received within the scope of the authentication and can be further used in conjunction with the terminal hash value without the need, for this purpose, for a separate data exchange step with regard to the permanent public key. Since the terminal hash value comprises the hash of the permanent public key, it is additionally ensured that the terminal hash value can be associated unambiguously with said terminal. Since it can be assumed that the public key is unique, it is ensured that, on account of the entry of the permanent public key into the terminal hash value, the terminal hash value itself also has a uniqueness and therefore an unambiguous identification of the terminal and thus an unambiguous authentication of the terminal can be ensured.

In accordance with one embodiment of the invention, if the terminal hash value is not validly stored in the ID token, following the successful verification of the first and second signature, the permanent public key is stored by the ID token in the ID token in a manner linked to the second timestamp, wherein the second timestamp specifies a maximum period of validity of the terminal hash value. If the terminal hash value is stored in the ID token, the second timestamp stored in a manner linked to the terminal hash value is by contrast read, and the terminal hash value is only deemed to be validly stored if the second timestamp is still valid.

For example, the metadata in accordance with one embodiment of the invention comprise the second timestamp.

In accordance with a further embodiment of the invention, it is possible that the second timestamp is generated for the storage of the terminal hash value in the ID token, wherein the timestamp is generated on the basis of a predefined relative period of validity. If the metadata comprise the second timestamp, the period of validity of the access of the terminal to the attribute starting from an initial time can thus be provided for a specific period of time without further authentication and with use of the first signature, the session-specific public key, the secret, etc. The complete authentication therefore is not carried out constantly in this case, but only at predefined times.

In addition, that which has been said in relation to the first timestamp applies similarly in relation to the second timestamp.

In principle, it is thus possible that the metadata, as described above, comprise the second timestamp, wherein in this case the terminal itself defines the intervals at which a complete authentication of the terminal by the ID token must be performed.

In accordance with one embodiment, the permanent certificate of the terminal is received by the ID token from the terminal in a first message, wherein the first message comprises a root certificate, wherein, if the terminal hash value is not validly stored in the ID token, the authentication by the ID token also comprises a verification of the permanent certificate of the terminal via the root certificate by means of a public key of a root stored on the ID token, wherein only once the permanent certificate of the terminal has been successfully verified via the root certificate is the terminal hash value stored in the ID token and access of the terminal to the attribute granted.

This could have the advantage that the way in which the access to the attribute is granted can be defined by a central trustworthy authority (root certification authority). Since the certification authority is usually trusted both by the ID token and by the terminal, the ID token can assume that all information contained in the metadata are to be considered as acceptable, in particular for reasons related to data protection. If, for example, sensitive personal information, such as a date of birth, biometric information, a residential address and many more, is located on the ID token, a user of the ID token does not need to worry that the terminal will obtain corresponding attributes in an unauthorised manner which the user of the ID token has not made available to the terminal. By safeguarding the trust of a central root certification authority, is ensured that a misuse of the token by the terminal is prevented.

In accordance with one embodiment, the first message is received without a previous announcement or reference of the certification authority of the permanent certificate received by the terminal. The use of MSE:Set DST for selection of the root certification authority of the terminal is thus spared, and instead the ID token works in principle with a single root certification authority. The terminal is aware of this, and therefore the selection by the ID token of a certificate of the terminal tailored to a specific certification authority is spared, and an additional data transfer step from the ID token to the terminal in order to request the relevant reference of the certification authority of the permanent certificate is thus spared. This could also further accelerate the authentication process.

In accordance with a further embodiment of the invention, the first secret is automatically generated following receipt of the session-specific public key of the terminal, without waiting for an explicit request of the terminal, and is sent to the terminal. Thus, instead of explicitly requesting the first secret in accordance with an MSE:Set AT by the terminal with an additional "Get Challenge" command, the first secret, without said explicit request "Get Challenge", is automatically sent to the terminal by the ID token following receipt of the session-specific public key or following receipt of the MSE:Set AT. This again also saves a further communication step between the ID token and terminal, so that the authentication could also be accelerated in this respect.

In accordance with a further embodiment of the invention, the method also comprises an authentication of the ID token to the terminal, wherein the authentication of the ID token comprises the following steps:

sending the public key of the ID token and a domain parameter associated with the public key to the terminal, wherein either the public key of the ID token is automatically sent without a prior explicit request by the terminal or the ID token has a plurality of different public keys, one of these different public keys is defined as a standard key, and the standard key is sent as the public key of the ID token to the terminal upon receipt of a general request for a public key by the terminal, calculating a second secret, which is shared with the terminal, from the private key of the ID token, the session-specific public key of the terminal, and the domain parameter, generating a random third secret, sending the random third secret to the terminal, and calculating a symmetric session key from the third secret and a second secret shared with the terminal, wherein the further following communication with the access to the attributes is carried out in an encrypted manner using the symmetric session key.

Following the above-described "Terminal Authentication", the process of "Chip Authentication" is thus performed, wherein, however, in this case too the public key of the ID token is automatically sent without a prior explicit request by the terminal in order to save communication steps. By way of example, there does not need to be any explicit reference of the key contained in an MSE:Set AT of the terminal, with no need for proof of possession of said key either. An MSE:Set AT is sufficient and the ID token will automatically send its own individual public keys to the terminal or, if it has a plurality of various public keys, will send one public key to the terminal defined by the ID token as a "Standard" key. The terminal therefore no longer explicitly transmits the reference of the key for which the ID token must prove knowledge of the associated private key.

It should be noted that in order to implement this embodiment either the detail of the reference of the key of which possession must be proven can be omitted in the MSE:Set AT command, or the transmission of the MSE:Set AT command by the terminal can even be omitted completely.

The actual proof of possession of the private key associated with the public key of the ID token is provided by said steps of calculating the shared second key, the random second secret, and the symmetric session key. Only if the ID token is able to calculate a symmetric session key which is identical to a symmetric session key calculated accordingly by the terminal can the subsequent communication between terminal and ID token actually occur with access to the attribute in an encrypted manner using the symmetric session key.

In a further aspect, the invention relates to an ID token comprising a communication interface, a processor, and a computer-readable storage medium, wherein the storage medium contains computer-readable instructions which, when run by the processor, prompt the execution of a method as described above.

In a further aspect, the invention relates to a method for granting access to an access-restricted security facility by means of an ID token, wherein the method comprises the following steps:
  carrying out the method, as described above, by the ID token,
  following the granting of the access of the terminal to the attribute, reading the attribute by the terminal and sending an access request to an authentication server, wherein the access request comprises the attribute in encrypted form,
  decrypting and checking the attribute by the authentication server, wherein the authentication server grants access to the security facility in the event of a successful check. For example, on the basis of the attribute, the authentication server is able to decide whether or not to grant access to the security facility.

In a further aspect, the invention relates to a security system, comprising an ID token as described above and an access-restricted security facility, a terminal, and an authentication server,
  wherein the terminal is designed, following a granting of access of the terminal to the attribute, to read the attribute and to send an access request to the authentication server, wherein the access request comprises the attribute in encrypted form,
  wherein the authentication server is designed to perform a decryption and checking of the attribute and to grant the access to the security facility in the event of a successful check.

In a further aspect, the invention relates to a computer-implemented method for controlling access of a terminal to an attribute stored in an ID token, wherein the ID token is associated with a user, wherein the method comprises a step of sending an identification of the terminal, by the terminal, to the ID token, wherein, if the ID token responds to the sending of the identification with the transmission of a session identification to the terminal, the terminal checks whether a session-specific session key validly associated with the session identification is stored in the terminal, wherein, if a session-specific session key validly associated with the session identification is stored, access of the terminal to the attribute is granted, wherein the access is carried out by means of a communication of the terminal with the ID token in an encrypted manner using the session-specific session key, wherein, if there is no session-specific session key validly associated with the session identification, the method comprises the following steps:
  authenticating the terminal to the ID token and authenticating the ID token by the terminal,
  following successful completion of the authentications, deriving a session-specific session key, wherein a subsequent communication with access to the attribute is carried out in an encrypted manner using a session-specific session key,
  deriving a session identification,
  storing, in the terminal, the session-specific session key associated with the session identification.

In accordance with one embodiment of the invention, the session identification is received by the terminal from the ID token in the form of a hash value together with a salt, wherein the terminal
  generates a temporary hash value for all session identifications stored in the terminal, in each case with the salt and the identification of the terminal,
  compares the temporary hash values with the received hash value and, if one of the hash values matches, uses the session identification associated with this hash value as the session identification for which a check is performed in order to ascertain whether a session-specific session key is stored in a validly associated manner.

In a further aspect, the invention relates to a terminal comprising a communication interface, a processor, and a computer-readable storage medium, wherein the storage medium contains computer-readable instructions which, when run by the processor, prompt the execution of the above-described method.

Embodiments of the invention will be explained in greater detail hereinafter with reference to the drawings, in which.

Figure 1:
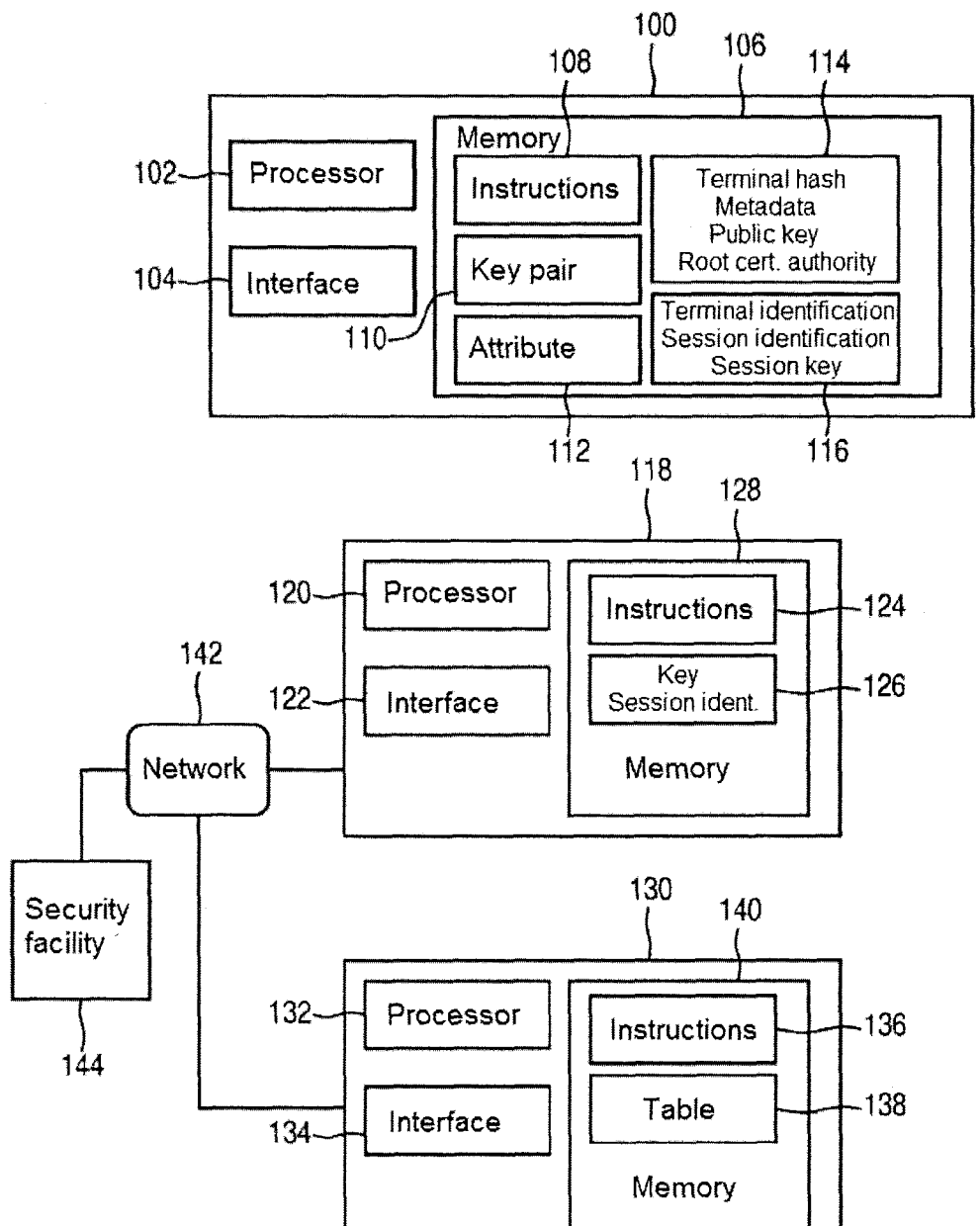
FIG. 1 shows a block diagram of a security system.

FIG. 1 shows a block diagram of a security system comprising an ID token 100, a terminal 118, an authentication server 130, and a security facility 144. The ID token can communicate with the terminal 118 via a wired or wireless interface 104 of the ID token 100 and an interface 122 of the terminal 118. The communication can be, in particular, a near-field communication, for example by means of RFID, Bluetooth or WLAN.

The interface 122 of the terminal 118, the interface 134 of the authentication server 130, and an interface (not shown further) of the security facility 144 can be used via a network 142 for communicating data with one another. By way of example, the network 142 can be the Internet.

The security facility 144 serves to secure access or entry to a sensitive region. By way of example, this region could be a spatial region and the security facility 144 could be a lock system, for example for a door. By way of example, a release of the opening of the door to the spatial region could be controlled by the security facility 144. In another example, the security facility 144 serves to protect data stored in a database. In this case, the security facility 144 controls access to the data stored in the database.

The ID token 100 serves as a "key" in order to grant access to the security facility 144. For this purpose, a memory 106 of the ID token 100 has an attribute 112, which, as explained hereinafter, is transmitted to the authentication server 130. The attribute 112 is used by the authentication server 132 to decide whether to grant the user of the ID token 100 access to the authentication server 130. The method described hereinafter ensures that both the ID token 100 and the terminal 118 trust one another and thus actually allow a mutual exchange of data with one another for communication of the attribute 112.

Figure 3:
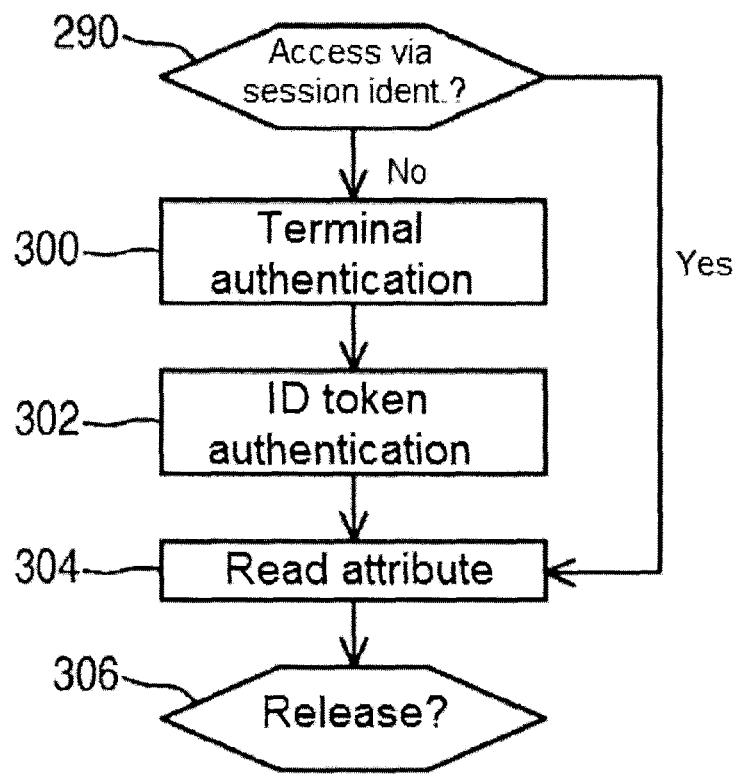
FIG. 3 shows a flow diagram of a method for granting access to an access-restricted security facility by means of an ID token.

As can be seen in the flow diagram of FIG. 3, the method which is used is performed in a number of steps. The multi-step nature of the method is known in part from the technical guideline TR-03110 from the German Federal Office for Information Security (BSI).

Firstly, in step 300, what is known as a terminal authentication is performed, in which the terminal must transmit a certificate to the ID token, for example a chip card. So that the card can validate this transmitted certificate, the terminal must transmit the certificate(s), which should enable the ID token to perform a verification by means of the root certificate installed in the ID token. A successful validation of the certificate means, for the ID token, that the terminal is trustworthy for further data exchange. This is therefore the basic precondition for execution of the further steps 302 to 306.

The ID token authentication in step 302 (also referred to as chip authentication) serves to prove that the token knows the private key associated with the public key made available to the terminal. If this public key is present on the ID token signed by the card issuer, the successful completion of the protocol between terminal and ID token means that the chip is authentic and has not been falsified.

Only once steps 300 and 302 have been successfully completed can the terminal, in step 304, read the attribute 112 from the memory 106 of the ID token 100 and make this available to the authentication server 130 by means of an encrypted communication. The authentication server 130 has a processor 132 and a memory 140, wherein the memory 140 has program instructions. The program instructions 136 serve on the one hand for encrypted communication with the terminal 118 via the interface 134 and serve on the other hand to reconcile the attribute 112, following receipt, with attributes stored in a table 138. By way of example, the table 138 could contain a large number of attributes which identify associated ID tokens unambiguously. The presence of the attribute in the table 138 is representative of a trustworthiness of the ID token 100 associated with this attribute, wherein the user of this ID token 100 is granted access to the security facility 144.

Once, in step 304, the attribute 112 has been read following terminal authentication and ID token authentication, a check is performed in step 306 by means of the program instructions 136 on the part of the authentication server 130 in order to establish whether or not access to the security facility 144 may be granted. If, in the present example, the attribute 112 is found in the table 138, access is granted. By way of example, in the case of a door, an opening signal is then sent to the security facility 144 via the network 142. In the case of access to data, a corresponding signal granting data access is transmitted to the security facility 144, and the security facility then grants access for example to sensitive regions of a database.

With reference to the flow diagram shown in FIG. 2, it will be explained hereinafter by way of example how the above-described terminal authentication and ID token authentication can be performed. Firstly, in step 200, the ID token receives via its interface 104 a permanent certificate of the terminal. A hash value can then be derived from the permanent certificate in step 202. By way of example, the permanent certificate comprises said hash value and a signature formed from this hash value and a private signature key and optional metadata. For example, an authentication of the terminal 118 is then possible by means of a public key associated with the permanent certificate.

It will be assumed hereinafter that the hash value derived in step 202 by the ID token 100 was previously not yet stored in a memory 106 as a terminal hash value (memory region 114) together with the associated metadata. This check is performed by way of example by means of a processor 102 of the ID token 100, wherein further program instructions 108 are contained in the memory 106, by means of which program instructions all steps described in relation to the ID token can be performed.

Once it has been determined (i.e. presumably) in step 204 that the terminal hash value (memory region 114) is not stored in the ID token, a complete authentication of the terminal by the ID token is carried out in the subsequent steps. In step 206, a verification of the permanent certificate is thus performed, by deriving a first signature from the permanent certificate of the terminal received in step 200 and verifying this first signature with the terminal hash value and a public key of the terminal associated with the permanent certificate. The associated permanent public key of the terminal can also be received together with the certificate or in the certificate of the terminal in step 200. The deriving of the first signature and the verification of the first signature are described in steps 208 and 210.

It is optionally possible that the permanent certificate is received from the terminal in a first message in step 200, wherein this said first message also comprises a root certificate. The permanent certificate of the terminal can then additionally be verified after step 204 in a root certification authority (memory region 114) via the root certificate by means of a public key stored on the ID token in the memory 106. It is thus ensured that the permanent public key of the terminal is trustworthy.

Provided it is determined in step 210 that the first signature is valid and additionally optionally the permanent certificate of the terminal is also valid, the method is continued. Otherwise, there is a termination (not shown in greater detail in FIG. 2) of the authentication method after step 210, and the authentication is aborted.

If the method is continued, what is known as a session-specific public key of the terminal 118 is received in step 212. The session-specific public key of the terminal is in this case a key which is used especially for the current communication session between ID token 100 and terminal 118, i.e. which has been generated especially for the current communication.

Once the session-specific public key has been received in step 212, a random first secret is generated and sent by the ID token 100 to the terminal 118 in step 214. This random first secret is also referred to as a "challenge" and is then used by the terminal 118 to generate a signature.

The terminal 118 also has a processor 120 and a memory 128. Instructions 124 are contained in the memory 128, which instructions allow the steps performed in relation to the terminal to be executed by means of the processor. Various key pairs (memory region 126) are also stored in the memory 128, for example the private and public keys of the terminal. The certificates of the terminal are also stored in the memory 128.

Once the ID token has generated the secret and sent this to the terminal 118 in step 214, the terminal then generates a signature using its permanent private key, the temporary (session-specific) public key, and the secret. The terminal then transmits the signature thus generated to the ID token 100, which in step 216 receives and verifies the signature. The verification of the signature received by the terminal is performed by the ID token 100 with use of the secret, the public key of the terminal associated with the permanent certificate, and the temporary (session-specific) public key of the terminal.

In the case of successful verification of this (second) signature, the hash value derived in step 202 is then stored together with the metadata, the permanent public key of the terminal, and an optional timestamp in the ID token 100 in step 218.

It should be noted that the above-described steps 206 to 216 are contained in the standard protocol for terminal authentication in accordance with Guideline TR-03110 of the BSI.

After step 218, the access to the attribute 112 is lastly granted in step 220.

However, before actual access is granted in this respect to the attribute, an additional ID token authentication, corresponding to step 302 of FIG. 3, is also carried out in subsequent steps. The ID token thus sends, in step 222, its public key and a domain parameter necessary for electric curve cryptography to the terminal 118. In return, the terminal transmits its session-specific public key to the ID token. This allows both the ID token and the terminal to generate a second secret in step 224.

The private key of the ID token, the session-specific public key of the terminal, and the domain parameter are involved in this generation of the second secret on the part of the ID token. The session-specific secret key of the terminal, the public key of the ID token, and the domain parameter are involved in the calculations of the second secret on the part of the terminal. The same second secret is thus generated on each side independently of one another.

Once both sides have then calculated the shared second secret, the ID token generates a third secret randomly in step 226 and derives a session key from this third secret with use of the second secret in step 230. In addition, in step 228, the third secret is transmitted to the terminal. The terminal itself can also generate the session key with use of the second secret calculated there and the third secret now received.

In step 232, encrypted access by the terminal to the attribute is then granted, wherein the encryption is performed with use of the (session-specific) session key.

Figure 4:
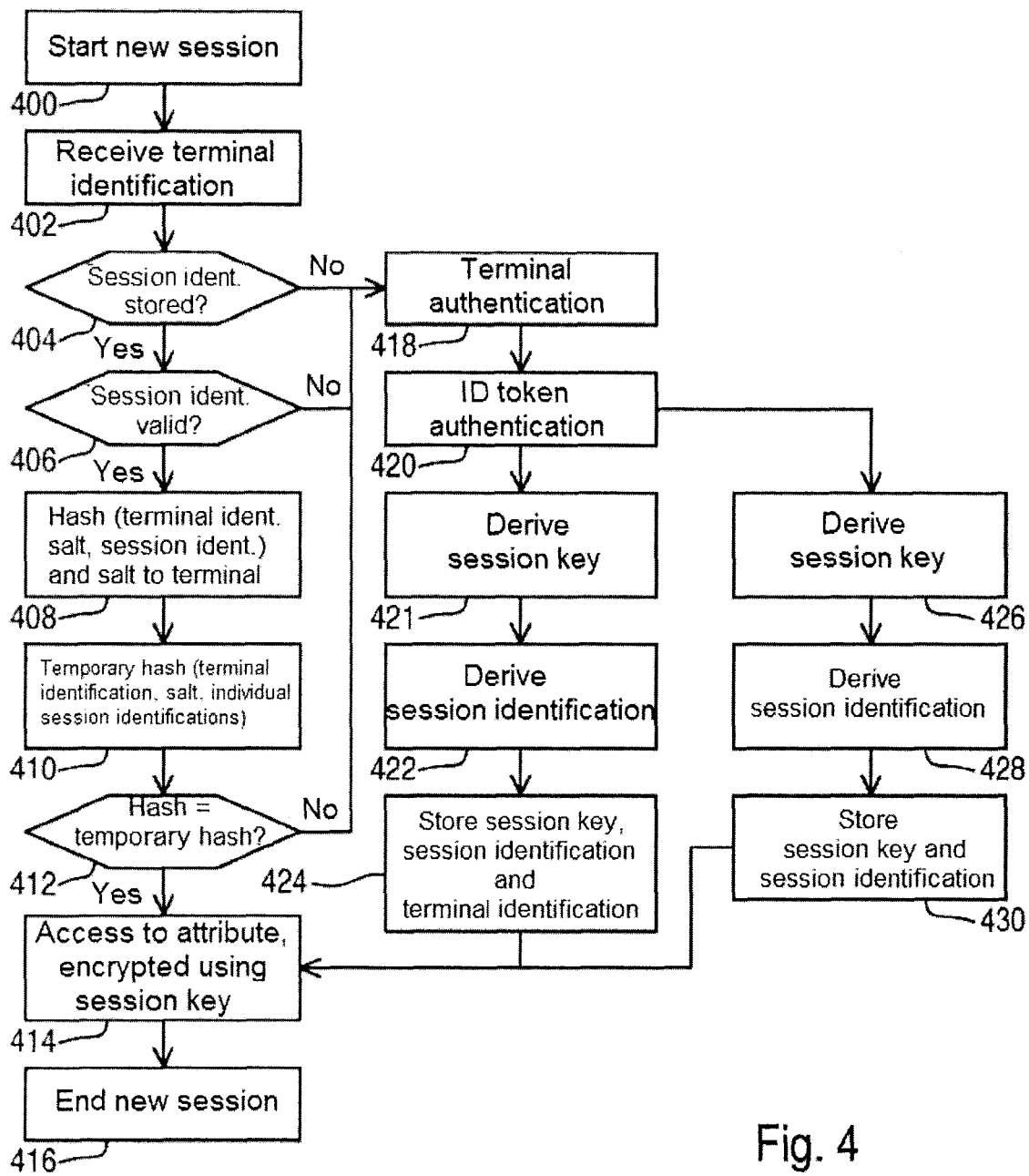
FIG. 4 shows a flow diagram of a method for controlling access of a terminal to an attribute stored in an ID token.

If the ID token is now used in a plurality of temporally separate sessions for access to the security facility, a modified method for controlling access of the terminal to the ID token can be used. This starts in the flow diagram of FIG. 3 with a step 290 upstream of the step 300. In the flow diagram of FIG. 4, this corresponds to steps 400-412, which will be explained in greater detail hereinafter.

It is assumed that in step 400 a new communication session starts between the terminal and ID token. Thus, some time may have passed between the original initial authentication of steps 300-304 including reading of the attribute. For example, a user of the ID token could seek access again to the security facility at a later moment in time.

In order to now accelerate the "checking method", checking whether the user should be granted access, it is firstly checked, following receipt of an identification of the terminal in step 402 by the ID token, whether this identification of the terminal was already stored in the ID token (step 404). If so, this means that a mutual authentication of the terminal and ID token has already previously been carried out successfully.

The ID token then checks, in step 406, whether the identification of the terminal is also validly stored. For example, the identification of the terminal could be provided with a temporal expiry date, whereupon the ID token compares this expiry date with the current system time. If the expiry date is chronologically before the system time, the session identification has expired. In this case, the method must pass to step 418.

If, by contrast, the result of the check in step 406 reveals that the session identification is valid, a hash value is generated in step 408 from the identification of the terminal, the session identification, and a salt. The salt, for example, is a randomly selected character sequence which increases the entropy of the hash value. This hash value is then transmitted from the ID token to the terminal, together with the salt.

In steps 410 and 412 the terminal attempts to find its locally stored session identifications with which the hash value is associated. For this purpose, temporary hash values are generated individually in step 410 for all session identifications which are stored in the terminal. The generation is performed again with use of the identification of the terminal and the salt. With step 412, the terminal then identifies the temporary hash value corresponding to the previously received hash value. The session identification associated with this identified temporary hash value is then the session identification of which the associated session-specific session key is used for the subsequent communication with the ID token (step 414). Here, step 414 is identical to step 304 in FIG. 3. The session then ends in step 416.

If the session identification is validly stored in the ID token, the complex execution of steps 300-302 can be foregone for the current session.

If either there is no session identification associated with the identification of the terminal stored in the ID token, or if the session identification is not validly stored in the ID token, the method continues after step 404 or 406 with step 418.

Figure 2:
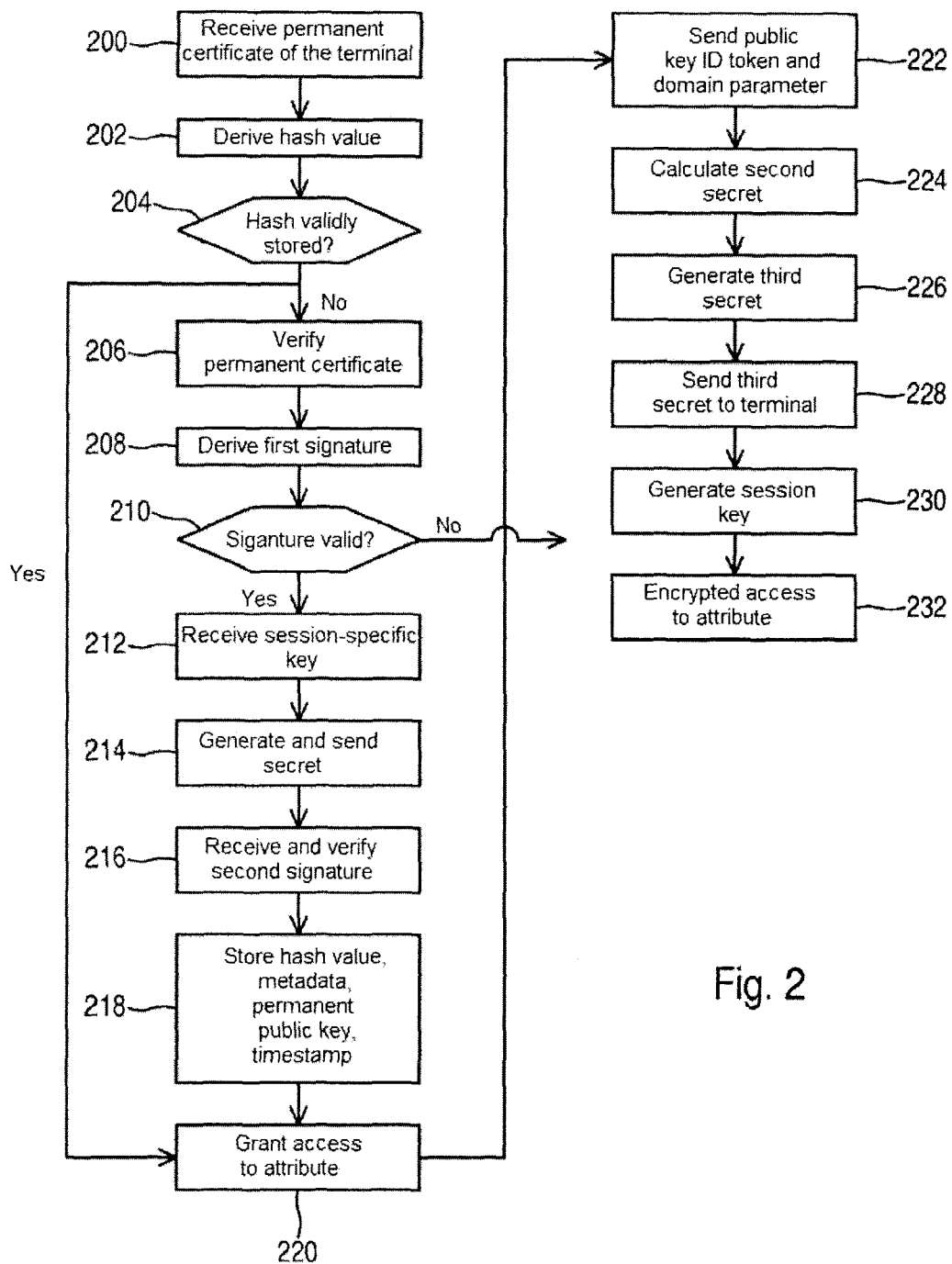
FIG. 2 shows a flow diagram of a method for controlling access of a terminal to an attribute stored in an ID token.

Step 418 corresponds for example to steps 200-220 in FIG. 2 and to step 300 in FIG. 3.

It has already been described above that in step 204 the terminal hash value was not validly stored in the ID token. This led to the execution of the following steps 206-218. If, however, the terminal hash value is validly stored in the ID token, this means that the ID token has classified the terminal as trustworthy in a previous session. Thus, steps 206-208 do not need to be performed, and the ID token grants the terminal immediate access to the attribute in step 220.

Nevertheless, the above-described ID token authentication must now still be carried out (steps 222-230 or step 420 or step 302). A session key results, in step 230, from the ID token authentication. This results both on the part of the ID token (block 426) and on the part of the terminal (block 421). According to Guideline TR-03110 of the BSI, the ID token and terminal each generate the session key individually, and the key itself is not exchanged.

In steps 420 and 428 the ID token and terminal, respectively, also preferably derive a secret session identification individually. In steps 424 and 430 the ID token and terminal, respectively, store the session key and the session identification linked to one another. The ID token additionally also stores the identification of the terminal in step 424 linked to the session identification.

The terminal, in step 414, can then access the attribute in the ID token, wherein the communication used for this purpose is carried out in an encrypted manner using the preferably symmetric session key. In step 416, the session started in step 400 ends.

If the ID token is used in a number of temporally separate sessions to access the security facility, the described modified authentication of the terminal by the ID token can be used. By way of example, in the case of first-time access to the security facility, the protocol of terminal authentication could be used completely with said steps 206 to 218, whereas in the event of a later attempt by means of the ID token 100 to access to security facility 144, the authentication of the terminal could be performed in said modified manner. To summarise, it is provided that the ID token 100, once this has derived the hash value in step 202, checks its memory 106 in order to determine whether a terminal hash value (memory region 114) resulting from an earlier authentication is stored. If so, instead of proceeding with step 206, step 220 is performed immediately. Due to the "cashing" of the terminal hash value in step 218, the ID token can thus determine that the ID token classified the terminal as trustworthy in a previous attempt of authentication of the terminal to the ID token.

So as not to have to now assume the trustworthiness of the terminal for all time, the hash value together with the expiry date of a period of validity can be stored in the ID token in particular. The hash value is thus stored in the ID token linked to a timestamp. The timestamp by way of example could specify an expiry date of the terminal hash value. If this expiry date has passed, the period of validity is now void in spite of the presence of the terminal hash value (memory region 114) in the memory 106 of the ID token, and therefore step 204 must be followed by steps 260 218 for a renewed execution of the authentication of the terminal.

The period of validity of the ID token can also be determined by a number of temporally separate sessions. Only once this number of sessions has been reached is a renewed complete authentication necessary.

It should be noted at this juncture that the timestamp checked in step 204 could differ from the timestamp checked in step 406.

It can also be provided that, together with the terminal hash value, the metadata which together with the permanent certificate of the terminal are omitted in step 200 by the ID token 100 are stored in the memory 106 of the ID token 100. As necessary, only some of the metadata can also be stored there. By way of example, the metadata can specify an access authorisation with regard to which of the attributes 112 located in the memory 106 the terminal wishes to access. In this regard, with the determination in step 204 that the terminal hash value is validly stored in the ID token, the metadata associated with the terminal hash value and stored in a manner linked thereto could also be read from the memory 106. This metadata could then be used for the further communication with the terminal. Besides access authorisations, the metadata can also comprise a unique ID of the terminal.

The permanent public key of the terminal can also be stored in the memory 106, linked to the terminal hash value. If it is thus determined that the hash value in step 204 is stored validly, the public key stored in a manner linked to the terminal hash value can be read, and here too can be used for further communication with the terminal.

It should be noted at this juncture that, within the scope of the entire description, no difference is made between keys in compressed and uncompressed form. Depending on requirements, a person skilled in the art will be able to work with compressed or uncompressed forms of the specified keys. This relates in particular to the session-specific key of the terminal, which is usually received and processed in compressed form from the ID token within the scope of terminal authentication (step 212).

The authentication server 130 is able to communicate with the terminal 118 via the interface 134 and the network 142. Communication occurs between the terminal 118 and authentication server 130 with use of encryption, so that the terminal directs an access request relating to access to the security facility 144 to the authentication server 130, wherein the access request comprises the attribute 112 in an encrypted manner. By way of example, end-to-end encryption can also be used.

For the sake of clarity, the method for controlling access of the terminal to the attribute stored on the ID token will be roughly explained again, summarised as follows:

1. Checking whether a session identification validly associated with the identification of the terminal is stored in the ID token. If not, modified authentication compared to Guideline TR-03110 of the BSI. If there is a valid association provided, direct access to the attribute, wherein the access is encrypted using the session key.
2. Modified terminal authentication, in which it is checked whether the terminal hash value is validly stored in the ID token. If not, complete terminal authentication according to Guideline TR-03110 of the BSI with subsequent ID token authentication according to Guideline TR-03110 of the BSI. If the terminal hash value is validly stored, direct access to the attribute, once the ID token authentication according to Guideline TR-03110 of the BSI has been performed, wherein the access is encrypted using the session key.

So as to be able to further increase the access speed of the terminal 118 to the attribute 112 on the whole, various optimisations could be performed. By way of example, the communication to the ID token 100 of a reference of the certification authority in relation to the permanent certificate could be omitted. If, instead, it is determined that in principle a single certification authority is used for this purpose, the announcement of the reference of the certification authority by the terminal can be omitted, and a request thereof by the ID token, necessary as appropriate, can also be spared accordingly. The volume is thus also reduced, and therefore the data transfer speed is increased on the whole. The MSE:Set DST command on the part of the terminal is thus partially or even completely invalid.

A further possibility lies in automatically carrying out step 214 with generation and sending of the secret once, in step 212, the session-specific key has been received. Step 214 is thus carried out directly after step 212, without in particular a command of the "Get Challenge" type having been transmitted by the terminal to the ID token.

A further gain in speed could lie in omitting, within the scope of the ID token authentication, a specific request by the terminal depending on the reference of the public key of the ID token of which possession by the ID token is to be proven. For example, the use of the MSE:Set AT command by the terminal could be completely omitted. Instead, the ID token sends the public key and the domain parameter associated with the public key automatically to the terminal once step 220 for example has been carried out, or generally once the terminal authentication in step 300 has been successfully completed.

If the ID token has a plurality of different public keys, one of these keys is defined in advance as a standard and, in the absence of an explicit request of the key by the terminal, said standard key is used and is sent in step 222. The automatic sending of the public key (and preferably also of the domain parameter) without prior explicit request can be carried out for example in response to the receipt of a "General Authenticate" command of the terminal.

Further optimisations could lie in the fact that, for security reasons, elliptic curves are used with a q which has at least a bit length of 224 bits in order to sign the terminal certificate and to generate the symmetric session key during the ID token authentication. The request for the symmetric session key could also be selected insofar as an AES-128 key is used.

The above-described hash methods could be carried out with use of a SHA-256 hash algorithm, especially since SHA-256 compared to SHA-224 has the same computing effort for the hash calculation with greater security.

A further possibility of the acceleration, in particular the verification of the permanent certificate of the terminal by the ID token, could lie in the fact that merely a "one-step hierarchy" is used in relation to the root certificate. Corresponding intermediate certificates could thus be omitted, and in this respect the request is merely considered to be a request that the ID token ultimately has an individual root certificate so as to thus carry out completely the verification of the certificate of the terminal.

In order to further minimise the data exchange between terminal and ID token, the permanent certificate of the terminal could be sent without any certificate extension. In addition, the smallest X.509 certificates with regard to the root certification authority and the certification authority which signs the certificates of the ID token should be used.

LIST OF REFERENCE SIGNS

100 ID token
102 processor
104 interface
106 memory
108 instructions
110 key pair
112 attribute
114 memory region
116 memory region
118 terminal
120 processor
122 interface
124 instructions
126 memory region
128 memory
130 authentication server
132 processor
134 interface
136 instructions
138 table
140 memory
142 network
144 security facility

The invention claimed is:

1. A computer-implemented method for controlling access of a terminal to an attribute stored in an ID token, wherein the ID token is associated with a user, wherein the method comprises receipt of an identification of the terminal by the ID token and checking by the ID token if a session identification validly associated with the identification of the terminal is stored in the ID token, wherein, if a session identification validly associated with the identification of the terminal is stored in the ID token, the ID token transmits the session identification to the terminal and grants the terminal access to the attribute, wherein a subsequent communication with access to the attribute is carried out in an encrypted manner using a session-specific session key, wherein the session-specific session key is stored in the ID token in a manner associated with the session identification or the identification of the terminal, wherein, if no session identification validly associated with the identification of the terminal is stored in the ID token, the method comprises the following steps:
  authenticating the terminal by the ID token and authenticating the ID token to the terminal, wherein, following successful authentications, the terminal is granted access to the attribute,
  deriving a session-specific session key, wherein a subsequent communication with access to the attribute is carried out in an encrypted manner using a session-specific session key,
  deriving a session identification,
  storing, in the ID token, the identification of the terminal associated with the session identification,
  storing, in the ID token, the session-specific session key associated with the identification of the terminal.

2. The method according to claim 1, wherein, if a session identification validly associated with the identification of the terminal is stored in the ID token, a salt is generated by the ID token and a hash value is generated from the identification of the terminal, the salt, and the session identification, wherein the session identification is transmitted from the ID token to the terminal in the form of a transmission of the hash value together with the salt.

3. The method according to claim 1, wherein, if a session identification validly associated with the identification of the terminal is stored in the ID token, access of the terminal to the attribute is granted for the current session between ID token and terminal without a further authentication process between ID token and terminal.

4. The method according to claim 1, wherein, by the ID token,
  if there is no session identification validly associated with the identification of the terminal stored in the ID token, metadata of a permanent certificate of the terminal are received by the ID token at the time of authentication of the terminal, wherein the metadata comprise an access authorization, wherein, following successful completion of the authentications, at least the access authorization is stored in the ID token in a manner associated with the identification of the terminal, and access of the terminal to the attribute is granted in accordance with the access authorization,
  if there is a session identification validly associated with the identification of the terminal stored in the ID token, the access authorization associated with the identification of the terminal is read by the ID token, wherein access of the terminal to the attribute is granted in accordance with the access authorization.

5. The method according to claim 1, wherein, by the ID token,
  if there is no session identification validly associated with the identification of the terminal stored in the ID token, a first timestamp is stored in the ID token in a manner associated with the identification of the terminal, following successful completion of the authentications, wherein the first timestamp specifies a maximum period of validity of the session-specific session key,
  if there is a session identification validly associated with the identification of the terminal stored in the ID token, the timestamp associated with the identification of the terminal is read, and the session-specific session key is deemed to be validly stored only if the first timestamp is still valid.

6. The method according to claim 5, wherein the metadata comprise the first timestamp.

7. The method according to claim 5, wherein the first timestamp is generated for storing the session-specific session key in the ID token, wherein the first timestamp is generated on the basis of a predefined relative period of validity.

8. The method according to claim 1, wherein the authentication by the ID token comprises the receipt of a permanent certificate of the terminal, the deriving of a terminal hash value from the certificate, and a checking as to whether the terminal hash value is validly stored in the ID token, wherein, if the terminal hash value is validly stored in the ID token, access of the terminal to the attribute is granted without further checking of the permanent certificate of the terminal, wherein the authentication by the ID token comprises the following steps:
deriving a first signature from the permanent certificate of the terminal and verifying the first signature with the terminal hash value and a public key of the terminal associated with the permanent certificate, wherein the terminal hash value comprises a hash of the metadata of the certificate,
receiving a session-specific public key of the terminal,
generating and sending a random first secret to the terminal,
receiving a second signature from the terminal and verifying the second signature with use of the session-specific public key of the terminal, the random first secret, and the public key of the terminal associated with the permanent certificate,
following successful verification of the first and second signature, storing the terminal hash value in the ID token.

9. The method according to claim 8, wherein the permanent public key of the terminal is contained in the permanent certificate, wherein the terminal hash value comprises a hash of the permanent public key.

10. The method according to claim 8, wherein, by the ID token,
if the terminal hash value is not validly stored in the ID token, following the successful verification of the first and second signature, the permanent public key is stored in the ID token in a manner linked to a second timestamp, wherein the second timestamp specifies a maximum period of validity of the terminal hash value,
if the terminal hash value is stored in the ID token, the second timestamp stored in a manner linked to the terminal hash value is read and the terminal hash value is deemed to be validly stored only if the second timestamp is still valid.

11. An ID token associated with a user, the ID token comprising a communication interface, a processor, and a non-transitory computer-readable storage medium, wherein the storage medium contains computer-readable instructions which, when run by the processor, prompt the execution of a method according to claim 1 control access of a terminal to an attribute stored in the ID token, wherein the ID token is configured to:
receive an identification of the terminal and check if a session identification validly associated with the identification of the terminal is stored in the ID token, wherein, if a session identification validly associated with the identification of the terminal is stored in the ID token, transmit the session identification to the terminal, grant the terminal access to the attribute, and carry out a subsequent communication with access to the attribute in an encrypted manner using a session-specific session key, wherein the session-specific session key is stored in the ID token in a manner associated with the session identification or the identification of the terminal, wherein, if no session identification validly associated with the identification of the terminal is stored in the ID token:
authenticate the terminal and enable the terminal to authenticate the ID token, wherein, following successful authentications, grant the terminal access to the attribute, derive a session-specific session key, wherein a subsequent communication with access to the attribute is carried out in an encrypted manner using the session-specific session key, derive a session identification, store the identification of the terminal associated with the session identification, and store the session-specific session key associated with the identification of the terminal.

12. The method according to claim 1, further comprising:
following the granting of the access of the terminal to the attribute, reading the attribute by the terminal and sending an access request to an authentication server, wherein the access request comprises the attribute in encrypted form, and
decrypting and checking the attribute by the authentication server, wherein the authentication server grants access to an access-restricted security facility in the event of a successful check.

13. A security system comprising an ID token, an access-restricted security facility, a terminal, and an authentication server,
wherein the ID token is configured to:
receive an identification of the terminal and check if a session identification validly associated with the identification of the terminal is stored in the ID token,
wherein, if a session identification validly associated with the identification of the terminal is stored in the ID token, transmit the session identification to the terminal, grant the terminal access to the attribute, and carry out a subsequent communication with access to the attribute in an encrypted manner using a session-specific session key, wherein the session-specific session key is stored in the ID token in a manner associated with the session identification or the identification of the terminal,
wherein, if no session identification validly associated with the identification of the terminal is stored in the ID token:
authenticate the terminal and enable the terminal to authenticate the ID token, wherein, following successful authentications, grant the terminal access to the attribute,
derive a session-specific session key, wherein a subsequent communication with access to the attribute is carried out in an encrypted manner using the session-specific session key,
derive a session identification,
store the identification of the terminal associated with the session identification, and store the session-specific session key associated with the identification of the terminal;
wherein the terminal is designed, following a granting of access of the terminal to the attribute, to read the attribute and to send an access request to the authentication server, wherein the access request comprises the attribute in encrypted form; and wherein the authentication server is designed to perform a decryption and check the attribute and to grant the access to the security facility in the event of a successful check.

14. A computer-implemented method for controlling access of a terminal to an attribute stored in an ID token, wherein the ID token is associated with a user, wherein the method comprises a step of sending an identification of the terminal, by the terminal, to the ID token, wherein, if the ID token responds to the sending of the identification with the transmission of a session identification to the terminal, the terminal checks whether a session-specific session key validly associated with the session identification is stored in the terminal, wherein, if a session-specific session key validly associated with the session identification is stored, access of the terminal to the attribute is granted, wherein the access is carried out by means of a communication of the terminal with the ID token in an encrypted manner using the session-specific session key, wherein, if there is no session-specific session key validly associated with the session identification, the method comprises the following steps:

authenticating the terminal to the ID token and authenticating the ID token to the terminal, following successful authentications, deriving a session-specific session key, wherein a subsequent communication with access to the attribute is carried out in an encrypted manner using a session-specific session key, deriving a session identification, storing, in the terminal, the session-specific session key associated with session identification.

15. The method according to claim 14, wherein the session identification is received by the terminal from the ID token in the form of a hash value together with a salt, wherein the terminal generates a temporary hash value for all session identifications stored in the terminal, in each case with the salt and the identification of the terminal, compares the temporary hash values with the received hash value and, if one of the hash values matches, uses the session identification associated with this hash value as the session identification for which a check is performed in order to ascertain whether a session-specific session key is stored in a validly associated manner.

16. A terminal, comprising a communication interface, a processor, and a non-transitory computer-readable storage medium, wherein the storage medium contains computer-readable instructions which, when run by the processor, control access of the terminal to an attribute stored in an ID token, wherein the ID token is associated with a user, and wherein the terminal is configured to:

send an identification of the terminal to the ID token, wherein, if the ID token responds to a sending of the identification with a transmission of a session identification to the terminal, check whether a session-specific session key validly associated with the session identification is stored in the terminal, wherein, if a session-specific session key validly associated with the session identification is stored, access the attribute by means of a communication with the ID token in an encrypted manner using the session-specific session key, wherein, if there is no session-specific session key validly associated with the session identification:

enable the ID token to authenticate the terminal and authenticate the ID token, following successful authentications, derive a session-specific session key, wherein a subsequent communication with access to the attribute is carried out in an encrypted manner using the session-specific session key, derive a session identification, and store the session-specific session key associated with the session identification.

* * * * *